Jan. 21, 1969  H. E. SCHWARTZ  3,423,081
CONTOUR CUTTING DEVICE
Filed Nov. 9, 1966  Sheet 1 of 3

INVENTOR.
HOWARD E. SCHWARTZ
BY
Meyer, Tilberry & Body
ATTORNEYS

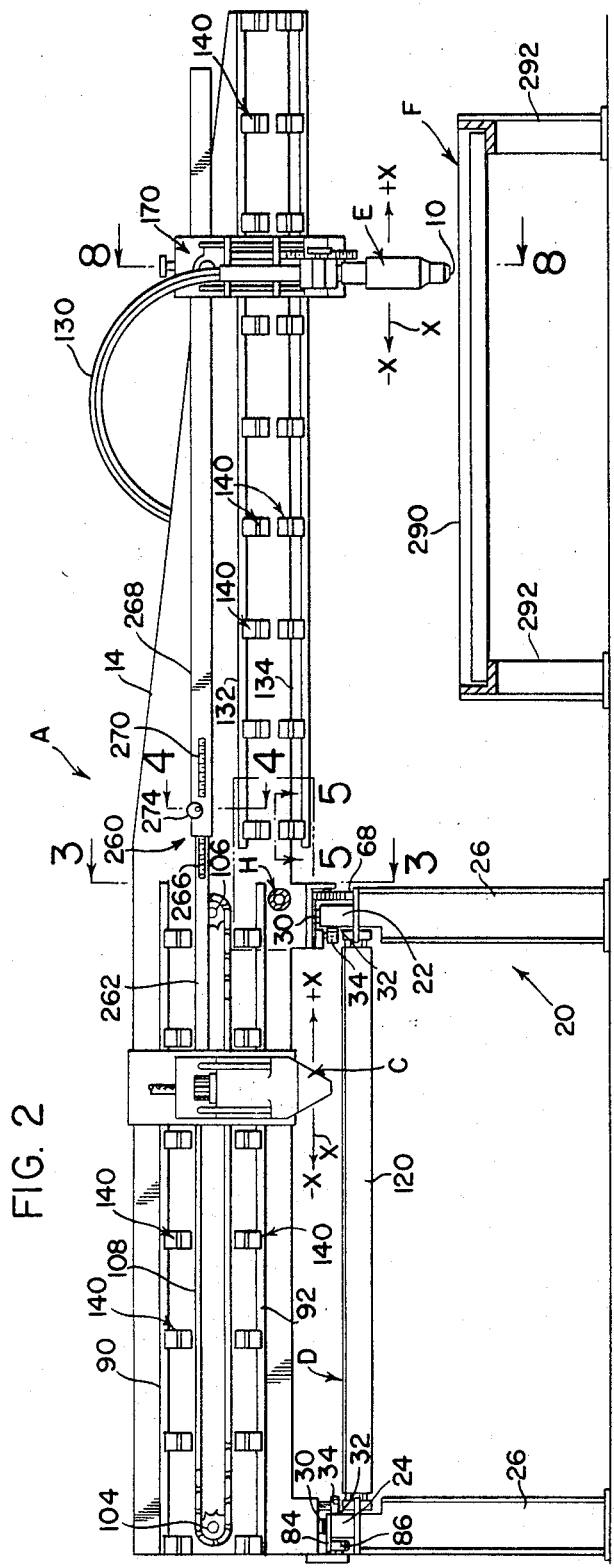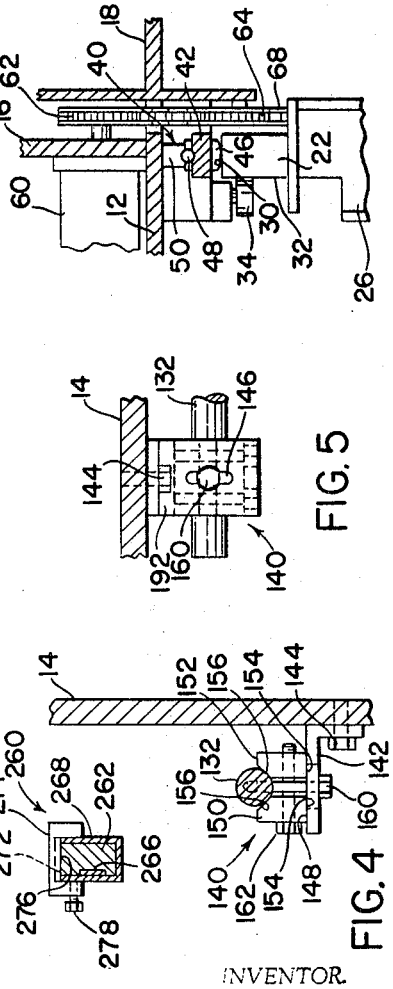

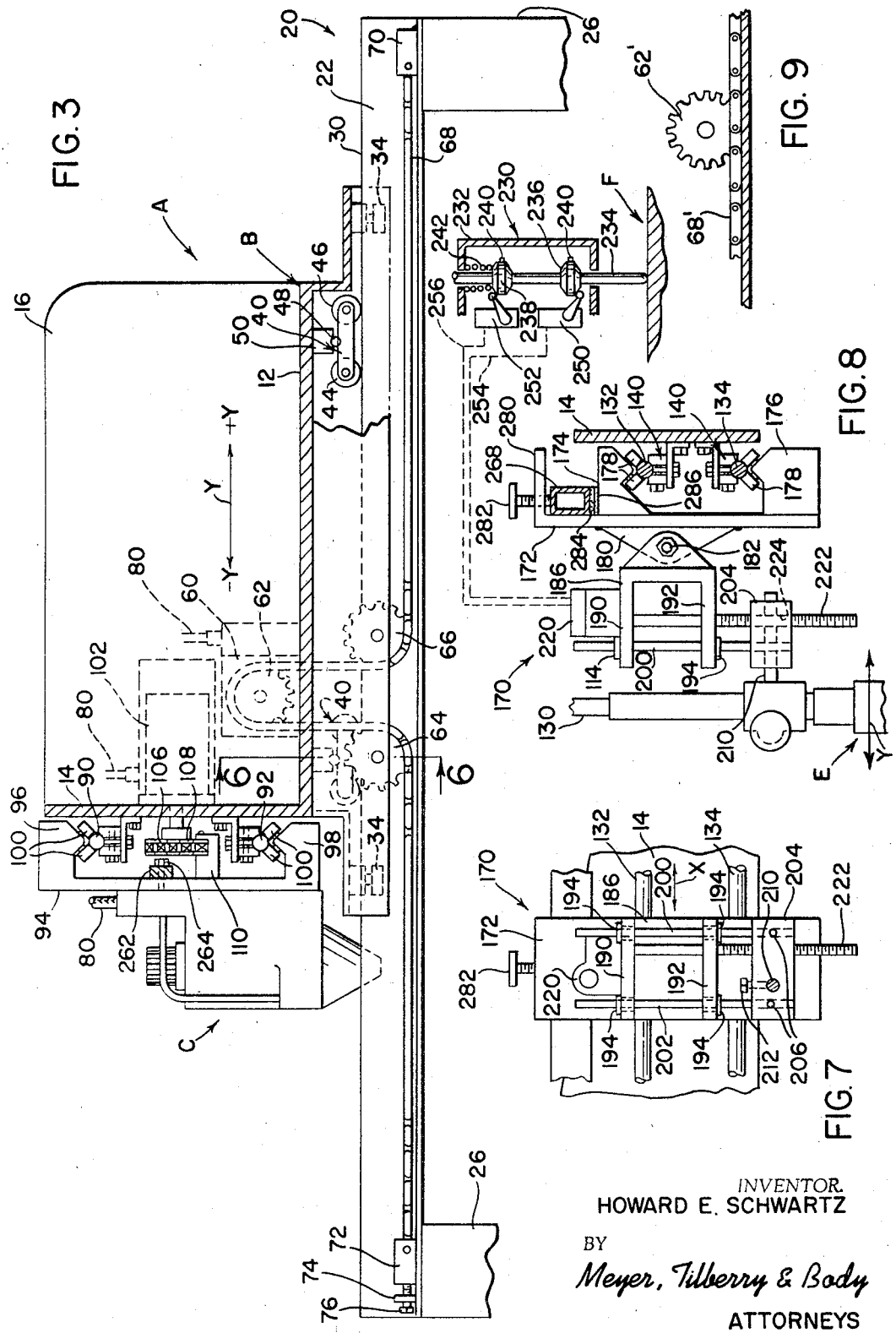

United States Patent Office 3,423,081
Patented Jan. 21, 1969

3,423,081
CONTOUR CUTTING DEVICE
Howard E. Schwartz, Northfield, Ohio, assignor to
Jetcut Corporation, Bedford, Ohio
Filed Nov. 9, 1966, Ser. No. 593,179
U.S. Cl. 266—23                           19 Claims
Int. Cl. B23k 7/04

This invention pertains to the art of cutting generally flat workpieces and more particularly to a contour cutting device for cutting such workpieces.

The invention is particularly applicable for cutting a preselected contour from a flat metal workpiece by a single cutting torch, such as an oxy-acetylene, plasma, or laser torch, and it will be described with particular reference thereto; however, it will be appreciated that the invention has broader applications and may be used for cutting various flat workpieces with two or more simultaneously movable cutting torches.

It has become quite common to cut given shapes from flat metal workpieces by a device which moves a cutting torch in accordance with a selected pattern which may be represented by a drawing or facsimile of the shape itself or by an appropriate automated program of the shape. The present invention relates to a device of the type that uses a drawing of the shape to control the movement of the cutting torch during its cutting operation. These devices generally include a frame for carrying both a follower and a torch with the follower and torch being moved in unison. Consequently, movement of the follower along the drawing moves the torch in a like manner, and, thus, cuts the desired shape into a workpiece supported opposite the cutting torch. At one time, oxyacetylene torches were used for this type of cutting operation, and the contour cutting devices were, in general, somewhat crude machines. Such machines could move the cutting torch in approximately the desired path because the oxy-acetylene torches cut relatively slowly, i.e. not more than 15–30 inches per minute. Of course, these oxy-acetylene cutting devices or machines could not provide an accurate cut at all times; therefore, subsequent grinding and shaping was usually needed when the shape of the workpiece was critical. Also, it has been found that these devices can not be operated at high speeds, approaching 200 inches per minute without prohibitive vibrations and extreme inaccuracies.

In recent years, plasma and laser torches have been developed with capabilities for economically cutting flat metal workpieces. These torches can cut many metals at a speed in the range of 200–400 inches per minute. With the advent of these high speed torches, it became immediately apparent that crude contour cutting devices or machines used with oxy-acetylene torches could not control the movement of torches cutting at the rate made possible by the plasma and laser torches. Accordingly, much work has been devoted to the development of contour cutting devices which can cut preselected shapes at high speeds with the necessary accuracy and uniformity. During development of these high speed cutting devices, certain factors other than cutting speed were considered to be important in any improved cutting device. It was essential that these improved cutting devices be more accurate than the older oxy-acetylene so that subsequent shaping of the workpiece is minimized, waste is reduced, and increased cutting tolerances are not needed. These factors are even more pronounced when expensive alloy sheets are being cut by the contour cutting device. Waste and scrap of these expensive alloys may result in substantial increases in the overall cost of the cutting operation.

The present invention relates to a contour cutting device which includes various features that combine to produce a device optimizing the above-mentioned characteristics, including increased cutting speed and accuracy without excessive vibrations.

In accordance with the present invention, there is provided an improvement in a contour cutting device having a scanning head movable along a preselected pattern with the movement of the scanning head being divided into first and second generally orthogonal components. A frame is mounted to move in a $y$ direction, and torch is mounted on the frame to move in an $x$ direction. This device includes means for moving the frame in the $y$ direction in response to the first component, means for moving the torch on the frame in the $x$ direction in response to the second component, and means for mounting a workpiece to be cut in a fixed position adjacent the torch whereby the workpiece is cut in accordance with the movement of the scanning head. In accordance with the present invention, there is provided a first motor on the frame and driven in response to the first component for moving the frame in a $y$ direction, a second motor on the frame and driven in response to the second component for moving the head and torch in the $x$ direction on the frame with the combined movement of these motors moving the torch to cut the workpiece. The frame is movable along rails extending in the $y$ direction by a removable chain mounted onto and coextensive with at least one of the rails and a sprocket rotatably driven by the first motor and engaged with the chain.

In accordance with another improvement of the basic cutting devices as defined above, the cutting device is provided with a supporting structure for the frame and at least three dollies for supporting the frame onto the supporting structure. These dollies each comprise two wheels rotatable about axes generally perpendicular to the $y$ direction, and these wheels have crowned outer bearing surfaces contacting the supporting structure.

In accordance with still a further improvement in the basic device described above, a mechanism is provided for mounting the torch onto the frame. This mechanism comprises two generally parallel rods and a bracket with the rods being reciprocally mounted in the bracket to move vertically with respect to the workpiece. The rods are fixed onto a lower block which, in turn, supports the torch so that the torch may be selectively moved by moving the block and rods, as a unit, with respect to the bracket.

The primary object of the present invention is the provision of a contour cutting device of the type used in cutting flat metal workpieces into desired shapes, which device allows cutting speeds approaching 200–400 inches per minute with accuracy and reliability.

Still another object of the present invention is to provide a contour cutting device of the type used in cutting flat metal workpieces into desired shapes, which device reduces vibrations and disturbances in moving the cutting torch at high speeds along a selected contour.

Yet another object of the present invention is to provision of a contour cutting device of the type described above, which device is durable in use and requires less maintenance than similar known devices.

These and other objects and advantages will become apparent from the following description used to illustrate the preferred embodiment of the invention as read in connection with the accompanying drawings in which:

FIGURE 2 is a front elevational view illustrating, somewhat schematically, the embodiment of the invention shown in FIGURE 1;

FIGURE 3 is a partial, enlarged, cross-sectional view taken generally along line 3—3 of FIGURE 2;

FIGURE 4 is a partial, enlarged, cross-sectional view taken generally along line 4—4 of FIGURE 2;

FIGURE 5 is a partial, enlarged, cross-sectional view taken generally along line 5—5 of FIGURE 2;

FIGURE 6 is an enlarged partial, cross-sectional view taken generally along line 6—6 of FIGURE 3;

FIGURES 7 and 8 are enlarged, partial views showing, in more detail, certain other features of the embodiment of the invention illustrated in the other figures; and, FIGURE 9 is a schematic view illustrating a slight modification of the invention as shown in the prior figures.

Figure 1:
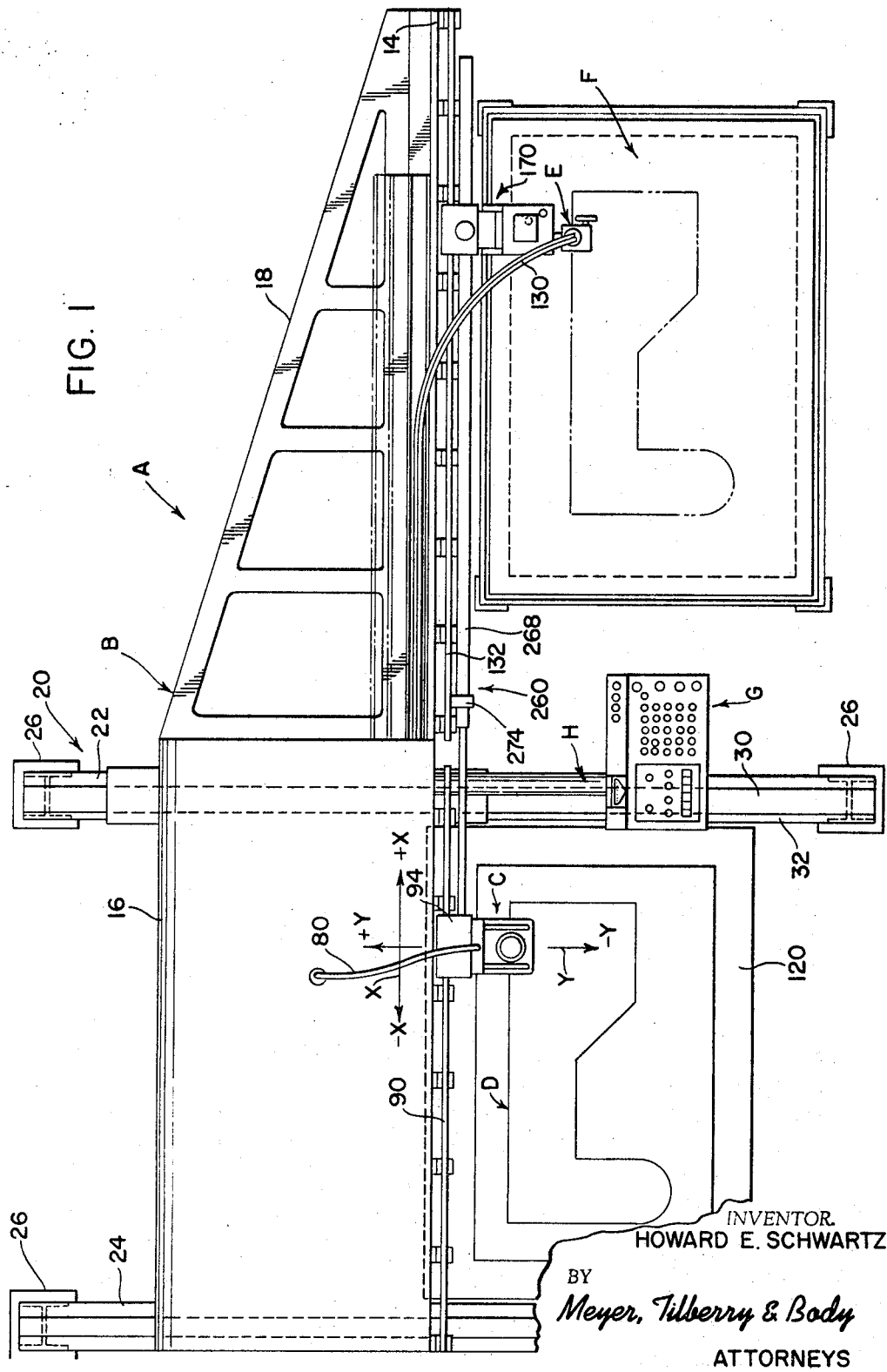
FIGURE 1 is a top plan view illustrating, somewhat schematically, the preferred embodiment of the present invention.

Referring now to the drawings wherein the showings are for the purpose of illustrating a preferred embodiment of the invention only and not for the purpose of limiting same, FIGURES 1–3 show a contour cutting device A, constructed in accordance with the present invention. This device includes a frame B movable in a direction y, a sensing head C, which preferably as a photosensitive scanner of known construction, a pattern D having a black line tracing of the desired shape to be cut, a cutting torch E, preferably a plasma torch having a nozzle 10, and a workpiece F which is to be cut as indicated by the phantom lines in FIGURE 1. The device A as controlled by a master panel G mounted in cantilever on tube H. In general operation of the contour cutting device A, the sensing head or scanning head C automatically moves along the path on pattern D. This requires that the sensing head move in a compound direction which can be resolved into first and second generally orthogonal components. The first component of movement of the sensing head causes the frame B to move along direction y by an electrical drive, discussed later. The second orthogonal component of the scanning head movement causes the torch E to move in a direction x, which movement, as will appear later, is a drive unit for the interconnected sensing head C and torch E. The combined movement of the frame and torch duplicates the movement of the sensing or scanning head C along the pattern D; therefore, the workpiece F is cut into a shape matching the desired shape of the outline or tracing on the pattern. The particular structures utilized for accomplishing this operational function will be fully appreciated after the following discussion of the preferred embodiment of the present invention.

Referring now to frame B, the frame includes a bottom support plate 12, a front plate 14, and a cover 16 which encloses the appropriate control mechanisms, not shown fully. In addition, the plate 14 extends outboard of the cover, and it is supported by an apertured strut 18. The apertures in strut reduce the weight of the cantilever portion of frame B. Frame B moves in a direction y on supporting structure 20. This structure includes, essentially, two generally parallel rails 22, 24 mounted on upright stands 26. Referring now more particularly to rail 22, with like numbers applying also to rail 24, the rail has an upper bearing surface 30 and a side bearing surface 32. Spaced stabilizing rollers 34 ride along surface 32 so that the frame is moved accurately in the y direction.

In FIGURES 3 and 6, four dollies 40, constructed in accordance with the present invention, are clearly illustrated. These dollies include a body 42 which supports two spaced wheels 44, 46. These wheels rotate about axes generally perpendicular to the y direction and have lower crowned surfaces. These crowned surfaces prevent dust and other debris from seriously affecting the rolling action of the wheels. In addition, the crowned surfaces of the wheels allow the dolly to pivot around a swivel or ball 48 positioned between the body 42 and a frame mounted boss 50. By providing the swivel connection for the frame supporting wheels 44, 46, the wheels can assume infinite operating positions so that the weight of the frame is evenly distributed on the wheels and they roll feely along the bearing surface 32.

Above rail 22 there is provided a motor 60 which drives the frame in a y direction, in accordance with signals received from sensing head C. In accordance with the invention, motor 60 includes a driven sprocket 62 and spaced idler sprockets 64, 66. A chain 68 is secured onto the rail 22 below surface 32, and the chain is supported in position by a fixed end block 70 and a movable end block 72. After the chain is entrained around the sprockets, as shown in FIGURE 3, the chain is placed under tension by an appropriately positioned collar 74 and tension bolt 76. This tension in the chain takes up all slack in the chain and provides an accurate drive for the frame in the y direction. Referring now to FIGURE 9, it is contemplated that the chain 68 may be mounted in a flat position, such as illustrated chain 68′. In this case, only a single driven sprocket 62′ is utilized for moving the frame in the y direction upon receipt of a signal through control lines 80 from the sensing head C. The chain may be easily replaced when worn with a minimum of expense. To further stabilize the frame B for movement in the y direction, a plate 84 is provided adjacent the upper surface of rail 24 and support wheels 86 bear against the under surface of this plate to provide vertical stability for the frame B.

The sensing head or follower C is movable along generally parallel rods 90, 92, the mounting of which will be described in detail with respect to the mounting of similar rods for the torch E. In accordance with the preferred embodiment of the present invention, the sensing head is of the type sold by The Canadian Westinghouse Company, Ltd. Hamilton, Ontario, under the trade name Linatrol. This device locks onto a line or pattern D and generates a signal or two signals indicative of the line of travel. These two signals are utilized for moving the frame B in the y direction and the sensing head C, itself, in the x direction along rods 90, 92. To support the head C it includes a rear frame 94 having vertically spaced arms 96, 98. The plurality of angularly disposed rollers 100 engage the upper portion of rod 90 and the lower portion of rod 92. Movement of the sensing head in the x direction is accomplished by a motor 102 which drives sprocket 104. An idler sprocket 106 is spaced from sprocket 104, and a chain 108 is entrained around the sprockets. This chain, in turn, is joined onto the rear of the sensing head C by a connector 110, best shown in FIGURE 3. As signals are sent through control line 80, the motor 102 moves the sensing head so that it travels along the line on the appropriate pattern in the x direction. At the same time, the frame B is moving in the y direction. This compound movement assures that the sensing head travels along the preselected path. A table 120 positions pattern D directly below the sensing head.

The torch E is provided with an appropriate input line 130, the characteristics of which are dictated by the type of torch being used. This torch is then mounted on parallel rods 132, 134. Since these rods must be maintained parallel within relatively close tolerances, a plurality of special mounting structures 140 are spaced along the rods 132, 134 and, in like manner, along rods 90, 92. Referring now more particularly to FIGURES 4 and 5, the mounting structures 140 each include a bracket 142 bolted onto plate 14 by a plurality of bolts 144. The bracket includes an elongated hole 146 and an upward surface 148 which slidably receive cam blocks 150, 152. The lower surface 144 of the cam blocks slide along the surface 148, and upper inclined surfaces 156 form a nest for the rod. A bolt 160 extends between the blocks, and into the rod, for locking the rod in place. A bolt 162 is threaded into block 152 and passes through block 150. To adjust the disposition of the rods 132, 134 the bolts 160 are loosened and bolts 162 are adjusted to change the position of the rod. Thereafter, the bolts 160 are tightened down which draws the rod against the inclined surfaces 156. By providing an elongated hole 146, the rods may be shifted transversely with respect to plate 14.

In accordance with the present invention, a novel torch supporting mechanism 170 is provided. This mechanism, best shown in FIGURES 7 and 8, includes a mounting frame 172 with vertically spaced support arms 174, 176. These support arms rotatably mount rollers 178 which ride along the parallel rods 132, 134 to allow movement of the torch in the $x$ direction. Outboard of mounting frame 172 is a plate 180 having an easily locked pivot 182 for adjusting the angular disposition of torch E, and more particularly the torch supporting bracket 186. This bracket is provided with vertically spaced arms 190, 192 having vertically aligned pairs of bushings 194. Rods 200, 202 are reciprocally mounted with respect to bushings 194 and are secured together by a lower block 204 having appropriate pins 206 for locking the rods 200, 202 in place. Block 204 is apertured to receive a torch supporting shaft 210 which is locked with respect to the block by a bolt 212. By providing the spaced rods 200, 202 and a lower block 204, the block is easily assembled and easily movable. The rods 200, 202 could be fixed on plates 190, 192 with the block 204 slidable on the rods and between the plates. All of these arrangements provide a compact torch mount.

On the upper arm 190, a motor and reducer 220 drives the downwardly extending lead screw 222. The lead screw is received within a threaded aperture 224 of block 204. This structure allows the block, and thus the torch, to be easily movable in a vertical direction by selective rotation of the lead screw 222. Rotation of the lead screw is automatically controlled, in accordance with the illustrated embodiment of the invention, by a device 230, shown in FIGURE 8. This device includes a housing 232, mounted on the torch or in a manner to move with the torch, and a downwardly extending feeler 234 which is adapted to ride upon the workpiece F. Cams 236, 238 are supported onto the feeler in a position adjusted by set screws 240. A spring 242 biases the feeler downwardly against the workpiece F. To control the rotation of feed screw 222, limit switches 250, 252 are operable by the cams 236, 238, respectively. As the feeler 234 moves downwardly a preselected distance, the limit switch 250 is energized. This causes rotation of motor 220 by a control signal sent through line 254. Since housing 232 is supported onto the torch E, the lower extension of feeler 234 indicates that the torch should be lowered. Accordingly, the control signal sent through line 254 rotates the lead screw 222 in a manner to lower torch E. A reverse signal is sent through line 256 by switch 252 when the torch is to be raised. It is appreciated that various modifications in this particular type of control may be utilized without departing from the intended spirit and scope of the present invention.

Referring now to FIGURES 1, 3 and 4, the sensing head C and the torch E are joined by an interconnector 260 which includes an inner rectangular member 262 bolted at 264 onto the head C. This inner rectangular member has a scale 266, and the member is telescopically received within an outer rectangular member 268. The scale 266 appears in a window 270 of the outer member to determine the extended length between the head C and the torch E. To lock the two telescoping members together, member 268 is provided with an upper opening 272 into which is slipped a plug 274 having an inner friction surface 276. A lock bolt 278 holds the plug 274 in position with the inner surface causing a friction lock between the inner and outer telescoping members.

The outer telescoping member 268 is secured onto the mounting frame 172, in a manner shown in FIGURE 8. The frame is provided with an upper arm 280 having a lock bolt 282. Brake linings 284, 286 are secured onto the lower surface of member 268 and the upper surface of arm 274, respectively. Accordingly, bolt 282 may be loosened and the torch E may be moved into the desired position. Thereafter, bolt 282 is tightened and the torch remains fixed with respect to member 268. This construction provides a firm lock between the torch and its moving member. As the sensing head C is moved in the direction $x$, the torch E is moved therewith because of the interconnector 260. In this manner, the workpiece F, which is supported onto a frame 290 held upwardly by stands 292, is cut by the torch in the desired shape.

By the combination of features described above, it has been found that the apparatus A easily cuts flat metal workpieces at rates approaching 200–400 inches per minute with accuracy and dependability heretofore unobtainable in this type of cutting device. Although only one torch E is illustrated, more than one torch can be used on the device A. The present invention has been described in connection with certain structural embodiments; however, it should be appreciated that various changes may be made in these structural embodiments without departing from the intended spirit and scope of the present invention as defined in the appended claims.

Having thus defined my invention, I claim:

1. In a contour cutting device having a scanning head movable along a preselected pattern, the movement of said scanning head being divided into first and second generally orthogonal components, a frame movable in a $y$ direction, a torch having a cutting nozzle, said torch being mounted on said frame and movable on said frame in an $x$ direction, means for moving said frame in said $y$ direction in response to said first component, means for moving said torch on said frame in said $x$ direction in response to said second component, and means for mounting a workpiece to be cut into a shape matching said pattern in a fixed position adjacent said cutting nozzle whereby said workpiece is cut in accordance with movement of said head, the improvement comprising: said head movable on said frame in said $x$ direction as said head moves along said pattern; and means for directly connecting said head onto said torch; said connecting means including a first elongated member connected onto said head and a second elongated member connected onto said torch, said elongated members being mutually telescoping with one member slidable into the other member, said outer telescopic member having a transverse opening, a locking element movable into said opening and into friction contact with said inner telescopic member, and means for locking said element in said friction contact whereby said locking allows slight transverse flexing without longitudinal movement between said telescoping members.

2. The improvement as defined in claim 1 wherein said torch is mounted onto said frame by a supporting fixture movable in the $x$ direction along said frame, said fixture having a surface with a brake lining thereon, said second telescopic member extending over said surface, and means on said fixture for selectively clamping said second member against said brake lining to allow adjustment of the torch along said $x$ direction.

3. The improvement as defined in claim 2 wherein said second member has a brake lining overlying said brake lining of said surface.

4. In a contour cutting device having a scanning head movable along a preselected pattern the movement of said scanning head being divided into first and second generally orthogonal components, a frame movable in a $y$ direction, a torch having a cutting nozzle, said torch being mounted on said frame and movable on said frame in an $x$ direction, means for moving said frame in said $y$ direction in response to said first component, means for moving said torch on said frame in said $x$ direction in response to said second component, and means for mounting a workpiece to be cut into a shape matching said pattern in a fixed position adjacent said cutting nozzle whereby said workpiece is cut in accordance with movement of said head, the improvement comprising: a first motor on said frame and driven in response to said first component for moving said frame in said $y$ direction, a second motor on said frame and driven in response to said second component for moving said head and torch in said $x$ direction on said frame, the combined movement of said motors moving said torch to cut said workpiece, said frame movable along rails extending in said $y$ direction, a removable chain mounted onto and coextensive with at least one of said rails, a sprocket rotatably driven by said first motor and engaged with said chain whereby rotation of said sprocket by said first motor moves said frame.

5. The improvement as defined in claim 4 including means for placing said chain under tension.

6. The improvement as defined in claim 5 including two idler sprockets in generally planar alignment with said driven sprocket and on opposite sides thereof, said chain being entrained under said idler sprockets and over said driven sprocket whereby tension in said chain urges said driven sprocket downwardly.

7. In a contour cutting device having a scanning head movable along a preselected pattern, the movement of said scanning head being divided into first and second generally orthogonal components, a frame movable in a $y$ direction, a torch having a cutting nozzle, said torch being mounted on said frame and movable on said frame in an $x$ direction, means for moving said frame in said $y$ direction in response to said first component, means for moving said torch on said frame in said $x$ direction in response to said second component, and means for mounting a workpiece to be cut into a shape matching said pattern in a fixed position adjacent said cutting nozzle whereby said workpiece is cut in accordance with movement of said head, the improvement comprising: a supporting structure for said frame, means on said structure for guiding said frame in said $y$ direction, at least three dollies for supporting said frame onto said support structure, said dollies each comprising two wheels rotatable about axes generally perpendicular to said $y$ direction, said wheels having outer bearing surfaces contacting said supporting structure.

8. The improvement as defined in claim 7 wherein said dollies each include a body for supporting said wheels and a pivoted connector between said wheel body and said frame.

9. The improvement as defined in claim 8 wherein said pivoted connector is a swivel joint.

10. The improvement as defined in claim 9 wherein said swivel joint is a ball between said frame and said body.

11. The improvement as defined in claim 7 wherein four of said dollies are provided.

12. In a contour cutting device having a scanning head movable along a preselected pattern, the movement of said scanning head being divided into first and second generally orthogonal components, a frame movable in a $y$ direction, a torch having a cutting nozzle, said torch being mounted on said frame and movable on said frame in an $x$ direction, means for moving said frame in said $y$ direction in response to said first component, means for moving said torch on said frame in said $x$ direction in response to said second component, and means for mounting a workpiece to be cut into a shape matching said pattern in a fixed position adjacent said cutting nozzle whereby said workpiece is cut in accordance with movement of said head, the improvement comprising: said torch being mounted on generally parallel cylindrical rods, and a plurality of axially spaced support devices for each of said rods, each of said support devices comprising a bracket with a surface generally parallel to and facing said rod, two blocks each having a lower surface slidable along said bracket surface and an upper inclined surface, said inclined surfaces facing each other and forming a nest for said rod, a camming means for moving said blocks simultaneously and in opposite directions to change the spacing of said rod from said bracket surface, and a bolt extending through said bracket and into said rod for locking said rod against said inclined surfaces after said rod has been adjusted with respect to said bracket.

13. The improvement as defined in claim 12 wherein said bracket has an elongated hole extending transverse of said rod and said bolt extends through said elongated hole.

14. In a contour cutting device having a scanning head movable along a preselected pattern, the movement of said scanning head being divided into first and second generally orthogonal components, a frame movable in a $y$ direction, a torch having a cutting nozzle, said torch being mounted on said frame and movable on said frame in an $x$ direction, means for moving said frame in said $y$ direction in response to said first component, means for moving said torch on said frame in said $x$ direction in response to said second component, and means for mounting a workpiece to be cut into a shape matching said pattern in a fixed position adjacent said cutting nozzle whereby said workpiece is cut in accordance with movement of said head, the improvement comprising: a mechanism for mounting said torch onto said frame, said mechanism comprising: two generally parallel rods; a bracket, said rods being mounted in said bracket; means for mounting said bracket onto said frame; a block vertically aligned with said bracket and reciprocally mounted by said rods; means for securing said torch onto said block; and means for selectively moving said block with respect to said bracket.

15. The improvement as defined in claim 14 wherein said bracket has upper and lower arms and said rods reciprocate through said arms.

16. The improvement as defined in claim 14 wherein said bracket has upper and lower arms and said rods are fixed thereto, said block being reciprocally mounted on said rods and between said arms.

17. The improvement as defined in claim 14 wherein moving means comprises a motor on said bracket, and a lead screw selectively rotated by said motor in opposite directions, said lead screw being threadably received in said block.

18. The improvement as defined in claim 17 including a device for sensing the spacing of said nozzle from said workpiece and means responsive to the sensed spacing to energize said motor selectively for adjusting the spacing of said nozzle from said workpiece.

19. The improvement as defined in claim 14 wherein bracket mounting means includes a first element movable in said $x$ direction on said frame and a pivoted connection between said first element and said bracket.

References Cited

UNITED STATES PATENTS

| | | | |
|---|---|---|---|
| 1,260,744 | 3/1918 | Austin | 266—23 |
| 2,421,827 | 6/1947 | Boyd | 266—23 |
| 2,508,468 | 5/1950 | Rathje | 266—23 CX |
| 2,538,876 | 1/1951 | Meincke | 266—23 CX |
| 3,172,938 | 3/1965 | Schwartz | 266—23 |
| 3,351,333 | 11/1967 | Owen et al. | 266—23 |

WILLIAM J. STEPHENSON, *Primary Examiner.*

EUGENE MAR, *Assistant Examiner.*